United States Patent
Ashida et al.

(10) Patent No.: US 11,643,773 B2
(45) Date of Patent: May 9, 2023

(54) GRAIN-FINISHED LEATHER-LIKE SHEET

(71) Applicant: KURARAY CO., LTD., Kurashiki (JP)

(72) Inventors: Tetsuya Ashida, Osaka (JP); Kansai Hara, Osaka (JP)

(73) Assignee: KURARAY CO., LTD., Kurashiki (JP)

( * ) Notice: Subject to any disclaimer, the term of this patent is extended or adjusted under 35 U.S.C. 154(b) by 82 days.

(21) Appl. No.: 17/440,240

(22) PCT Filed: Mar. 17, 2020

(86) PCT No.: PCT/JP2020/011609
§ 371 (c)(1),
(2) Date: Sep. 17, 2021

(87) PCT Pub. No.: WO2020/203243
PCT Pub. Date: Oct. 8, 2020

(65) Prior Publication Data
US 2022/0010485 A1    Jan. 13, 2022

(30) Foreign Application Priority Data

Apr. 5, 2019 (JP) ............................... JP2019-072652

(51) Int. Cl.
*B32B 27/12* (2006.01)
*D06N 3/14* (2006.01)
(Continued)

(52) U.S. Cl.
CPC ............. *D06N 3/145* (2013.01); *B32B 5/022* (2013.01); *B32B 27/08* (2013.01); *B32B 27/12* (2013.01);
(Continued)

(58) Field of Classification Search
CPC ........ B32B 2260/021; B32B 2260/046; B32B 2262/0223; B32B 2262/023;
(Continued)

(56) References Cited

U.S. PATENT DOCUMENTS

| | | | |
|---|---|---|---|
| 2010/0159772 A1 | 6/2010 | Ashida et al. |
| 2020/0157736 A1 | 5/2020 | Shinozaki |
| 2020/0277730 A1 | 9/2020 | Nakayama et al. |

FOREIGN PATENT DOCUMENTS

| | | | |
|---|---|---|---|
| JP | H05279967 A | 10/1993 |
| JP | H09-31862 A | 2/1997 |

(Continued)

OTHER PUBLICATIONS

Extended European Search Report dated Nov. 28, 2022 in Patent Application No. 20784987.8, 10 pages.
(Continued)

*Primary Examiner* — Lawrence D Ferguson
(74) *Attorney, Agent, or Firm* — Element IP, PLC

(57) ABSTRACT

Disclosed is a grain-finished leather-like sheet including: a fiber base material; a polyurethane intermediate layer stacked on the fiber base material; and a polyurethane skin film stacked directly on the polyurethane intermediate layer or via another polyurethane layer, wherein the polyurethane skin film contains a silicone-modified polyurethane, and the grain-finished leather-like sheet has an uneven surface whose skewness (Ssk), kurtosis (Sku), and maximum height (Sz) of surface roughness in accordance with ISO 25178 respectively satisfy $-0.4 \leq Ssk \leq -0.2$, $3 \leq Sku \leq 4$, $60\ \mu m \leq Sz \leq 150\ \mu m$.

17 Claims, 2 Drawing Sheets

(51) Int. Cl.
  *B32B 5/02* (2006.01)
  *B32B 27/08* (2006.01)
  *B32B 27/20* (2006.01)
  *B32B 27/40* (2006.01)
  *D06N 3/00* (2006.01)

(52) U.S. Cl.
  CPC .............. *B32B 27/20* (2013.01); *B32B 27/40* (2013.01); *D06N 3/0011* (2013.01)

(58) Field of Classification Search
  CPC .... B32B 2262/0253; B32B 2262/0261; B32B 2262/0276; B32B 2262/0284; B32B 2262/0292; B32B 2266/0278; B32B 2307/584; B32B 2307/732; B32B 27/065; B32B 27/08; B32B 27/12; B32B 27/20; B32B 27/40; B32B 3/30; B32B 5/022; B32B 5/024; B32B 5/026; B32B 5/18; B32B 5/245; D06N 2209/105; D06N 3/0011; D06N 3/0029; D06N 3/0034; D06N 3/0065; D06N 3/0077; D06N 3/128; D06N 3/143; D06N 3/145; D06N 3/183
  See application file for complete search history.

(56) References Cited

FOREIGN PATENT DOCUMENTS

| | | |
|---|---|---|
| JP | 3071383 B2 | 7/2000 |
| JP | 2000248472 A | 9/2000 |
| JP | 2002339262 A | 11/2002 |
| JP | 2012107101 A | 6/2012 |
| JP | 2013194336 A | 9/2013 |
| JP | 2016211129 A | 12/2016 |
| JP | 2017078242 A | 4/2017 |
| WO | WO-2006137394 A1 | 12/2006 |
| WO | WO-2018221301 A1 | 12/2018 |
| WO | WO-2019004180 A1 | 1/2019 |

OTHER PUBLICATIONS

International Search Report dated Jun. 16, 2020 in PCT/JP2020/011609 (with English translation), 5 pages.

GRAIN-FINISHED LEATHER-LIKE SHEET

TECHNICAL FIELD

The present invention relates to a grain-finished leather-like sheet that is excellent in scratch resistance.

BACKGROUND ART

Grain-finished leather-like sheets having a grain-finished external appearance resembling that of a natural leather are known as the skin materials of bags, clothing, shoes, and the like. When the surface of such a grain-finished leather-like sheet is scratched with a pointed object, scratches are formed. Such scratches impair the external appearance of the grain-finished leather-like sheet. Conventionally, several techniques for reducing the formation of scratches on the grain-finished leather-like sheet, or making the formed scratches less conspicuous have been proposed.

For example, PTL 1 listed below discloses, as a leather-like molded article with improved scratch resistance, a leather-like molded article including an uppermost layer that is stacked either on a molded article in which collagen is added to or partly reacted with a synthetic resin material, or on a synthetic resin layer in which collagen is dispersed and that is provided on a base material, the uppermost layer being made of a synthetic resin material in which collagen is added to or partly not reacted with a synthetic resin material.

PTL 2 listed below discloses a grain-finished leather-like sheet having surface smoothness and gloss, and color brightness, being excellent in scratch resistance, abrasion resistance, and creasing resistance, and further having a favorable texture. Specifically, PTL 2 discloses a grain-finished leather-like sheet including a fiber base material layer, a polyurethane non-porous layer, and a polyurethane surface layer that are stacked successively in this order, the polyurethane surface layer containing a binder polyurethane and polyurethane fine particles with a particle size of 1 to 50 μm, wherein a total thickness of the polyurethane non-porous layer and the polyurethane surface layer is 150 μm or more, the polyurethane surface layer contains the polyurethane fine particles in an amount of 10 to 40 parts by mass per 100 parts by mass of the binder polyurethane, and the polyurethane fine particles are not exposed on the surface of the polyurethane surface layer.

PTL 3 listed below discloses, as a leather-like sheet that enables a scratch to be easily repaired by heating when a scratch or a pressed shape is formed on the leather-like sheet, a leather-like sheet including a grain layer containing a shape-memory polyurethane elastomer.

PTL 4 listed below discloses a self-repairing formable coating composition that is excellent in self-repairability capable of achieving both the self-repairability for scratches and the durability of a coating film, the coating composition containing an acrylic resin, a polyisocyanate, and an additive.

CITATION LIST

Patent Literatures

[PTL 1] Japanese Laid-Open Patent Publication No. H5-279967
[PTL 2] WO 2006/137394
[PTL 3] Japanese Laid-Open Patent Publication No. 2016-211129
[PTL 4] Japanese Laid-Open Patent Publication No. 2012-107101

SUMMARY OF INVENTION

Technical Problem

Grain-finished leather-like sheets are problematic in that scratches are likely to be left thereon. It is an object of the present invention to provide a grain-finished leather-like sheet on which scratches are less likely to be left.

Solution to Problem

In order to obtain a grain-finished leather-like sheet that is excellent in scratch resistance, the present inventors have found the surface state of a grain-finished leather-like sheet on which scratches are less likely to be left, and thus have arrived at the present invention.

That is, an aspect of the present invention is directed to a grain-finished leather-like sheet including: a fiber base material; a polyurethane intermediate layer stacked on the fiber base material; and a polyurethane skin film stacked directly on the polyurethane intermediate layer or via another polyurethane layer, wherein the polyurethane skin film contains a silicone-modified polyurethane, and the grain-finished leather-like sheet has an uneven surface whose maximum height (Sz), skewness (Ssk), and kurtosis (Sku) of surface roughness in accordance with ISO 25178 respectively satisfy 60 μm≤Sz≤150 μm, −0.4≤Ssk≤−0.2, and 3≤Sku≤4. Such a grain-finished leather-like sheet has an uneven surface having a large height difference so as to satisfy 60 μm≤Sz≤150 μm, having many fine valleys so as to satisfy −0.4≤Ssk≤−0.2, and further having, on the surface thereof, sharp peaks and valleys so as to satisfy 3≤Sku≤4, and has a surface formed by a polyurethane skin film containing a silicone-modified polyurethane. With such a surface, it is possible to provide a grain-finished leather-like sheet that is resistant to scratching, and on which scratches are less likely to be left due to the microscopically uneven surface. It is preferable that the polyurethane intermediate layer is a polyurethane porous layer, from the viewpoint that the grain-finished leather-like sheet has excellent cushioning properties, and that creases are less likely to be left thereon when bent.

It is preferable that the uneven surface of the grain-finished leather-like sheet has a maximum peak height (Sp) that satisfies 20 μm≤Sp≤70 μm, a maximum valley depth (Sv) that satisfies 20 μm≤Sv≤100 μm, an arithmetic mean height (Sa) that satisfies 2≤Sa≤10, or a root mean square height (Sq) that satisfies 1≤Sq≤10.

Advantageous Effects of Invention

According to the present invention, it is possible to provide a grain-finished leather-like sheet on which scratches are less likely to be left.

DESCRIPTION OF EMBODIMENT

A grain-finished leather-like sheet according to the present embodiment is a grain-finished leather-like sheet including: a fiber base material; a polyurethane intermediate layer stacked on the fiber base material; and a polyurethane skin film stacked directly on the polyurethane intermediate layer or via another polyurethane layer, wherein the polyurethane skin film contains a silicone-modified polyurethane, and the grain-finished leather-like sheet has an uneven surface whose maximum height (Sz), skewness (Ssk), and kurtosis (Sku) of surface roughness in accordance with ISO 25178 respectively satisfy 60 µm≤Sz≤150 µm, −0.4≤Ssk≤−0.2, and 3≤Sku≤4.

Figure 1:
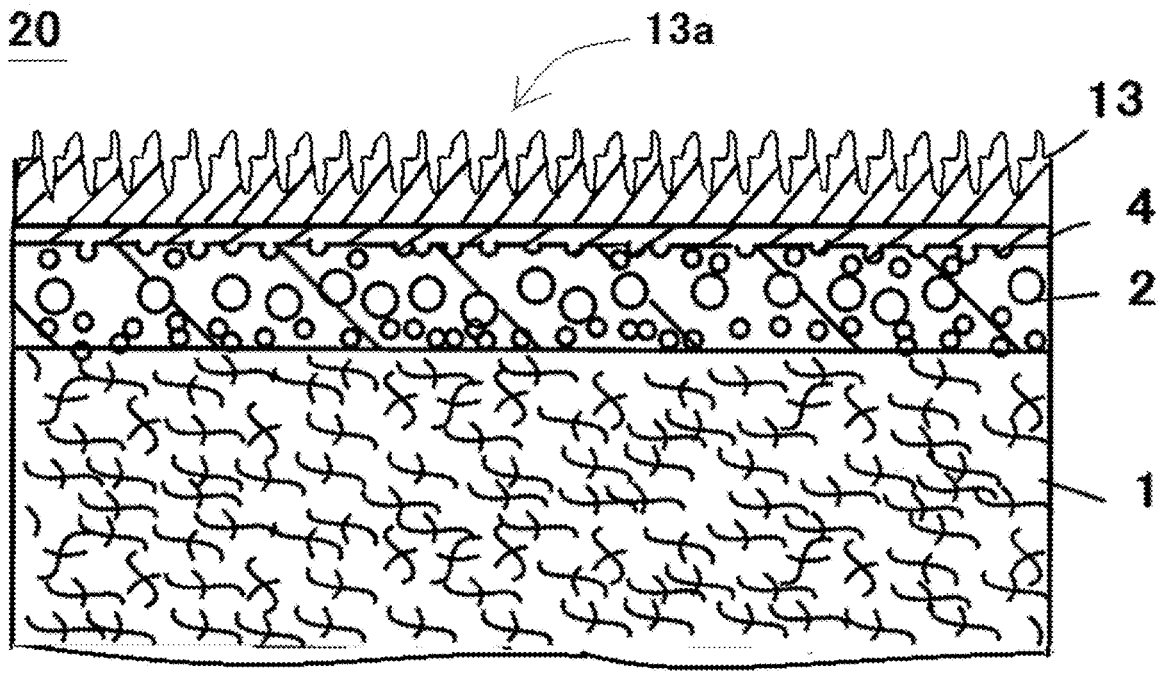
FIG. 1 is a schematic cross-sectional view schematically illustrating a cross section of a grain-finished artificial leather 10 according to an embodiment in a thickness direction thereof.

FIG. 1 is a schematic cross-sectional view schematically illustrating a cross section of a grain-finished artificial leather 10, which is an example of the grain-finished leather-like sheet according to the present embodiment, in a thickness direction thereof. The grain-finished artificial leather 10 includes a fiber base material 1, a polyurethane intermediate layer 2 stacked on the fiber base material 1, and a polyurethane skin film 3 attached so as to cover the polyurethane intermediate layer 2. The polyurethane skin film contains a silicone-modified polyurethane. Also, a microscopically uneven surface 3a is formed on the surface of the polyurethane skin film 3.

Also, the microscopically uneven surface has a maximum height (Sz), a skewness (Ssk), and a kurtosis (Sku) of surface roughness in accordance with ISO 25178 that respectively satisfy 60 µm≤Sz≤150 µm, −0.4≤Ssk≤−0.2, and 3≤Sku≤4.

Here, the maximum height (Sz) of surface roughness in accordance with ISO 25178 is a parameter representing the distance from the highest point to the lowest point with respect to the mean plane. The surface of the grain-finished leather-like sheet of the present embodiment satisfies 60 µm≤Sz≤150 µm, and thus is formed as a surface having a significant difference between the highest point of peaks and the lowest point of valleys with respect to the mean plane. When Sz<60 µm, scratches are less likely to be concealed by peaks and valleys, and thus become more conspicuous. When Sz>150 µm, scratches are likely to be formed on peak portions protruding at higher positions on the surface.

The maximum height (Sz) is the difference between a maximum peak height (Sp), which is a maximum value of the height from the mean plane of the surface, and a maximum valley depth (Sv), which is an absolute minimum value of the height from the mean plane of the surface. The maximum peak height (Sp) preferably satisfies 20 µm≤Sp≤70 µm, and more preferably satisfies 20 µm≤Sp≤60 µm, because scratches are likely to be concealed by peaks and thus become less conspicuous. The maximum valley depth (Sv) preferably satisfies 20 µm≤Sv≤100 µm, and more preferably satisfies 20 µm≤Sv≤60 µm, because scratches are less likely to be formed on valleys.

The skewness (Ssk) of surface roughness in accordance with ISO 25178 is a parameter representing the symmetry of a height distribution. When Ssk=0, it is indicated that the height distribution with respect to the mean plane is vertically symmetrical. When Ssk>0, it is indicated that the surface has many fine peaks with respect to the mean plane. When Ssk<0, it is indicated that the surface has many fine valleys. The surface of the outermost layer of the grain-finished leather-like sheet according to the present embodiment satisfies −0.4≤Ssk≤−0.2, and thus is formed as a surface having many fine valleys. In the case where −0.2<Ssk, the height distribution with respect to the mean plane is vertically symmetrical, or the surface has many fine peaks, so that scratches are likely to be formed on many peak portions protruding from the surface. In the case where Ssk<−0.4, the number of fine valleys is excessively increased, and the number of fine peaks is reduced, so that scratches formed on the surface become more conspicuous.

The kurtosis (Sku) of surface roughness in accordance with ISO 25178 is a parameter representing the sharpness of a height distribution. When Sku=3, it is indicated that the height distribution is normal distribution with respect to the mean plane. When Sku>3, it is indicated that there are many sharp peaks and valleys with respect to the mean plane. When Sku<3, it is indicated that the surface is flat. The surface of the outermost layer of the grain-finished leather-like sheet according to the present embodiment satisfies 3≤Sku≤4, and thus is formed as a surface in which many sharp peaks and valleys are distributed with respect to the mean plane. In the case where Sku<3, the height distribution is small, and the surface becomes flat, and therefore scratches formed on the surface become more conspicuous. In the case where Sku>4, the number of sharp peaks and valleys on the surface are excessively increased, so that scratches are likely to be formed on sharp peak portions.

The arithmetic mean height (Sa) of surface roughness in accordance with ISO 25178 is a parameter representing the mean of the absolute value of the height difference at each point with respect to the mean plane of the surface. The Sa of the surface of the outermost layer of the grain-finished leather-like sheet according to the present embodiment preferably satisfies 2≤Sa≤10. Additionally, the root mean square height (Sq) of surface roughness in accordance with ISO 25178 is a parameter corresponding to the standard deviation of the distance from the mean plane. The Sq of the surface of the outermost layer of the grain-finished leather-like sheet according to the present embodiment preferably satisfies 1≤Sq≤10, because the height deviation is suitably homogeneous.

Referring to FIG. 1, as the fiber base material 1, conventionally known artificial leather base materials used for the production of an artificial leather and conventionally known synthetic leather fiber base materials used for a synthetic leather, such as a non-woven fabric, a woven fabric, a knitted fabric, or a base material formed by impregnating an elastic polymer such as a polyurethane into these materials, can be used without any particular limitation. The thickness of the fiber base material is not particularly limited, and is, for example, preferably 300 to 3000 µm, and more preferably 500 to 1500 µm.

The type of the fibers for forming the fiber base material is not particularly limited. Specific examples thereof include polyester fibers, including, for example, aromatic polyester-based resins such as polyethylene terephthalate (PET), a modified polyethylene terephthalate, polybutylene terephthalate (PBT), polytrimethylene terephthalate (PTT), polytriethylene terephthalate, polyhexamethylene terephthalate, polypropylene terephthalate, and polyethylene naphthalate, and aliphatic polyester-based resins such as polylactic acid, polyethylene succinate, polybutylene succinate, polybutylene succinate adipate, and a polyhydroxybutyrate-polyhydroxyvalerate copolymer; polyamide-based resins such as polyamide 6, polyamide 66, polyamide 610, polyamide 10, polyamide 11, polyamide 12, and polyamide 6-12; polyolefin-based resins such as polypropylene, polyethylene, polybutene, polymethylpentene, a chlorine-based polyolefin, an ethylene vinyl acetate copolymer, and a styrene ethylene copolymer; modified polyvinyl alcohol-based resins formed from a modified polyvinyl alcohol or the like containing 25 to 70 mol % of an ethylene unit; and crystalline elastomers such as a polyurethane-based elastomer, a polyamide-based elastomer, and a polyester-based elastomer. Among these, polyamide-based resins and aromatic polyester-based resins are preferable because of the excellent balance between various properties.

The fineness and the configuration of the fibers are also not particularly limited. For example, it is possible to use regular fibers having a fineness of more than 1 dtex, or ultrafine fibers having a fineness of less than 1 dtex. As for the fiber configuration, it is possible to use solid fibers, or fibers having voids, such as hollow fibers or lotus root-like fibers.

Referring to FIG. 1, in the grain-finished artificial leather 10, the polyurethane intermediate layer 2 is a porous polyurethane layer stacked on the surface of the fiber base material 1.

The polyurethane porous layer can be formed, for example, by applying, to the surface of the fiber base material, a polyurethane solution that can be wet-coagulated, and thereafter immersing the fiber base material in water, to coagulate the porous polyurethane. Although the polyurethane porous layer is shown as an example of the polyurethane intermediate layer in the grain-finished artificial leather 10, the polyurethane intermediate layer may be a non-porous polyurethane layer. Specific examples of the polyurethane contained in the polyurethane solution that can be wet-coagulated include a polyester glycol-based polyurethane including, as a polyol component, polyethylene adipate, polybutylene adipate, polypropylene adipate, polyhexamethylene adipate, polycaprolactone, polymethyl valerolactone, or the like; a polypropylene glycol-based polyurethane; a polytetramethylene glycol-based polyurethane; a polycarbonate-based polyurethane; and a polytetramethylene glycol-polycarbonate copolymer-based polyurethane. Examples of the solvent contained in the polyurethane solution include dimethylformamide (DMF), which is a hydrophilic solvent.

The thickness of the polyurethane intermediate layer is preferably about 100 to 600 µm, and more preferably about 200 to 400 µm.

Note that the polyurethane intermediate layer may be allowed to permeate into the fiber base material for the purpose of imparting the shape stability. Examples of the method for allowing the polyurethane intermediate layer to permeate into the fiber base material include a method in which the fiber base material is impregnated with the polyurethane solution in advance, then further coated with the polyurethane solution, and thereafter immersed in water so as to be coagulated.

Also, the grain-finished leather-like sheet according to the present embodiment includes at least a polyurethane skin film that has a microscopically uneven surface, and that is stacked on the polyurethane intermediate layer directly or via another polyurethane layer. Referring to FIG. 1, in the grain-finished artificial leather 10, the polyurethane skin film 3 having the microscopically uneven surface 3a is attached so as to cover the polyurethane intermediate layer 2.

The method for forming the polyurethane skin film 3 having a microscopically uneven surface is not particularly limited, as long as an uneven surface having the above-described ranges of a skewness (Ssk), a kurtosis (Sku), and a maximum height (Sz) of surface roughness is formed. Examples thereof include a method described below.

First, a polyurethane skin film containing a silicone-modified polyurethane is stacked on the surface of the polyurethane intermediate layer stacked on the fiber base material, thus forming a grain-finished leather-like sheet base material including a smooth grain layer.

The polyurethane that forms the polyurethane skin film contains a silicone-modified polyurethane. Due to the inclusion of a silicone-modified polyurethane in the polyurethane that forms the polyurethane skin film, scratches are less likely to be formed on the surface of the grain-finished artificial leather.

The silicone-modified polyurethane is a polyurethane in which a siloxane bond is incorporated in a main chain or a side chain of the polyurethane. The silicone-modified polyurethane is formed, for example, by reacting a polyol, a chain extender, an active hydrogen group-containing organopolysiloxane, and a polyisocyanate, using a known polyurethane production method.

Examples of the silicone-modified polyurethane vary between different polyol components, and include a silicone-modified polycarbonate-based polyurethane, a silicone-modified polyester-based polyurethane, and a silicone-modified polyether-based polyurethane. Among these, a silicone-modified polycarbonate-based polyurethane is preferable because they are particularly excellent in durability.

The polyurethane skin film may contain a silicone unmodified polyurethane other than a silicone-modified polyurethane. Specific examples of the silicone unmodified polyurethane include a polycarbonate-based polyurethane, a polyester-based polyurethane, and a polyether-based polyurethane that are not modified with silicone.

As for the content ratio of the silicone-modified polyurethane in the polyurethane that forms the polyurethane skin film when dimethylsiloxane is contained, the polyurethane preferably contains, for example, 10 to 50 mass % of dimethylsiloxane.

The polyurethane skin film may contain, in addition to the polyurethane containing a silicone-modified polyurethane, a polymer other than a polyurethane, such as a synthetic rubber, a polyester elastomer, and a silicone elastic body, and an additive such as a light resisting agent and a dispersing agent, as long as the effects of the present invention are not impaired. Also, it is preferable that the polyurethane skin film is colored with a pigment. The polyurethane skin film may be either unfoamed (non-porous) or foamed (porous), but it is particularly preferable that the polyurethane skin film is unfoamed.

Referring to FIG. 1, for the grain-finished artificial leather 10, examples of the method for attaching the polyurethane skin film 3 containing a silicone-modified polyurethane so as to cover the polyurethane intermediate layer 2 include a method in which a solution or a dispersion of a polyurethane composition for forming the polyurethane skin film 3 on the surface of the polyurethane intermediate layer 2 is applied in an amount required to form the desire thickness, using a gravure roll coater, a comma coater, a spray coater, or the like, and the solution or the dispersion is coagulated or solidified using a dry method or a wet method. In this manner, a grain-finished leather-like sheet base material including a smooth grain layer is formed.

The thickness of the polyurethane skin film that is attached so as to cover the polyurethane intermediate layer is not particularly limited, but is preferably 2 to 30 µm, and more preferably 5 to 20 µm, because a surface having the above-described microscopic irregularities can be easily formed.

Also, using an embossing roll having, on the circumferential surface thereof, irregularities for forming the above-described surface shape, microscopic irregularities (grains) are formed on the surface of the polyurethane skin film of the grain-finished leather-like sheet base material including a smooth grain layer.

On the circumferential surface of the embossing roll, irregularities for forming, on the surface of the polyurethane skin film of the grain-finished leather-like sheet base material, an uneven surface whose maximum height (Sz), skewness (Ssk), and kurtosis (Sku) of surface roughness in accordance with ISO 25178 respectively satisfy 60 µm≤Sz≤150 µm, −0.4≤Ssk≤−0.2, and 3≤Sku≤4 are formed.

The configuration of the irregularities on the circumferential surface of the embossing roll is, for example, preferably a pattern of microscopic irregularities including recesses having an average depth of 20 to 100 µm that are provided on the entire circumference of an embossing surface at a density of 10 to 40 recesses/mm².

The surface temperature of the embossing roll is adjusted according to the thickness and the composition of the polyurethane skin film and the polyurethane intermediate layer, but is preferably 160 to 190° C., and more preferably 170 to 180° C., because an uneven surface that satisfies 60 µm≤Sz≤150 µm, −0.4≤Ssk≤−0.2, and 3≤Sku≤4 can be easily formed.

The linear load of the embossing roll is adjusted according to the thickness and the composition of the polyurethane skin film and the polyurethane intermediate layer, but is preferably 5 to 30 kg/cm, and more preferably 10 to 20 kg/cm, because an uneven surface that satisfies 60 µm≤Sz≤150 µm, −0.4≤Ssk≤−0.2, and 3≤Sku≤4 can be easily formed.

Furthermore, the processing speed, which is dependent on the diameter and the number of rotations of the embossing roll, is adjusted according to the thickness and the composition of the polyurethane skin film and the polyurethane intermediate layer, but is preferably 0.5 to 5 m/min, and more preferably 1 to 3 m/min, because an uneven surface that satisfies 60 µm≤Sz≤150 µm, −0.4≤Ssk≤−0.2, and 3≤Sku≤4 can be easily formed.

In this manner, a grain-finished leather-like sheet according to the present embodiment is obtained that has an uneven surface whose maximum height (Sz), skewness (Ssk), and kurtosis (Sku) of surface roughness in accordance with ISO 25178 respectively satisfy 60 µm≤Sz≤150 µm, −0.4≤Ssk≤−0.2, and 3≤Sku≤4.

The grain-finished leather-like sheet according to the present embodiment has been described above in detail with reference to FIG. 1, showing, as an example, a grain-finished artificial leather 10 that includes a fiber base material 1, a polyurethane intermediate layer 2 stacked on the fiber base material 1, and a polyurethane skin film 3 attached so as to cover the polyurethane intermediate layer 2, and that has a microscopically uneven surface 3a. The layer configuration of the grain-finished leather-like sheet according to the present invention is not limited to the above-described layer configuration, and is not particularly limited as long as the grain-finished leather-like sheet is a grain-finished leather-like sheet having an uneven surface whose maximum height (Sz), skewness (Ssk), and kurtosis (Sku) of surface roughness in accordance with ISO 25178 respectively satisfy 60 µm≤Sz≤150 µm, −0.4≤Ssk≤−0.2, and 3≤Sku≤4.

Figure 2:
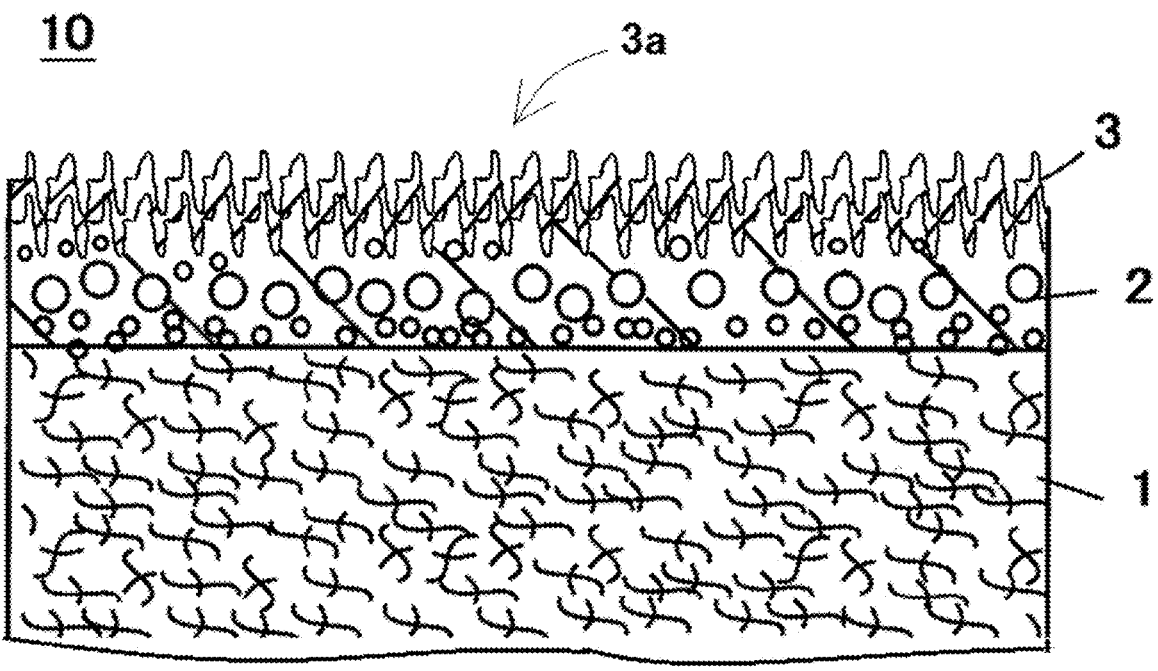
FIG. 2 is a schematic cross-sectional view schematically illustrating a cross section of a grain-finished artificial leather 20 according to another embodiment in a thickness direction thereof.

For instance, the above-described example illustrates a grain-finished artificial leather 10 including a fiber base material 1, a polyurethane intermediate layer 2 stacked on the fiber base material 1, and a polyurethane skin film 3 attached so as to cover the polyurethane intermediate layer 2 without any adhesion layer interposed between the polyurethane skin film 3 and the polyurethane intermediate layer 2, wherein a microscopically uneven surface 3a is formed from the polyurethane skin film 3 side through embossing using an embossing roll. In place of such a configuration, the grain-finished leather-like sheet may be a grain-finished artificial leather produced by forming a polyurethane skin film on release paper having a microscopic grain pattern formed on the surface thereof, the grain-finished artificial leather having an uneven surface that satisfies 60 µm≤Sz≤150 µm, −0.4≤Ssk≤−0.2, and 3≤Sku≤4. FIG. 2 is a schematic cross-sectional view schematically illustrating a cross section, in the thickness direction, of a grain-finished artificial leather 20 obtained in such a manner.

The grain-finished artificial leather 20 incudes a fiber base material 1, a polyurethane intermediate layer 2 stacked on the fiber base material 1, and a polyurethane skin film 13 bonded to the polyurethane intermediate layer 2 via an adhesion layer 4. Also, a microscopically uneven surface 13a is formed on a surface of the grain-finished artificial leather 20 on the polyurethane skin film 13 side.

Such a grain-finished artificial leather 20 is produced, for example, in the following manner.

A fiber base material 1 on which a polyurethane intermediate layer 2 is stacked is produced in the same manner as in the production step of the grain-finished artificial leather 10. Meanwhile, a polyurethane skin film is formed on release paper having a microscopic grain pattern formed on the surface thereof. Specifically, an excessive amount of a polyurethane solution or a polyurethane molten resin is applied onto the release paper. For example, using a coater such as a knife coater, a bar coater, or a roll coater, the polyurethane solution or the polyurethane molten resin is applied in an amount corresponding to the thickness of the clearance of the coater. Then, the polyurethane solution or the polyurethane molten resin is coagulated or solidified using a dry method or a wet method, whereby a polyurethane skin film is formed. The polyurethane skin film may be a single layer, or may be composed of a plurality of layers.

Note that when the polyurethane skin film has a stacked structure including a polyurethane skin intermediate layer and a polyurethane outermost layer (top layer) attached so as to cover the polyurethane skin intermediate layer, for example, a film of the polyurethane outermost layer is formed on the release paper, and a polyurethane film for forming the polyurethane intermediate layer is formed on the film of the polyurethane outermost layer, whereby a polyurethane skin film having a stacked structure including the polyurethane outermost layer and the polyurethane skin intermediate layer is formed.

The thickness of the polyurethane skin film is preferably 10 to 100 µm, and more preferably 20 to 50 µm. When the polyurethane skin film is too thin, the abrasion resistance of the surface tends to be reduced.

A polyurethane adhesive is applied to a film of the polyurethane skin film, then the solvent is completely or incompletely removed, and dried. Then, the polyurethane adhesive stacked on the film of the polyurethane skin film formed on the release paper in this manner is attached to the surface of the polyurethane intermediate layer, and then pressed, followed by curing the polyurethane adhesive, thus bonding the polyurethane skin film via the polyurethane adhesion layer. Then, the release paper is released from the surface of the polyurethane skin film, whereby a grain-finished artificial leather 20 including the polyurethane skin film 13 is obtained.

The thickness of the polyurethane adhesion layer is preferably 5 to 200 μm, and more preferably 30 to 70 μm. When the polyurethane adhesion layer is too thick, the bending resistance tends to be reduced, resulting in a reduction in the bonding strength.

The total thickness of the polyurethane skin film and the polyurethane adhesion layer is preferably about 10 to 300 μm, more preferably about 30 to 200 μm, and particularly preferably about 50 to 100 μm, from the viewpoint that the balance between the mechanical properties and the texture can be maintained.

The grain-finished leather-like sheet according to the present embodiment described above can be preferably used, for example, preferably as a skin material for bags, clothing, shoes, and the like, and particularly preferably as a skin material for a Randoseru (an elementary school bag in Japan).

EXAMPLES

Hereinafter, the present invention will be described in further detail by way of examples. It should be appreciated that the scope of the invention is by no means limited to the examples.

First, evaluation methods for the examples will be summarized below.
(Surface Roughness in Accordance with ISO 25178)

The surface roughness of a surface of the grain-finished leather-like sheet on the polyurethane skin film side was measured in accordance with ISO 25178 (surface roughness measurement), using a non-contact type surface roughness/shape tester "One-Shot 3D Measuring Macroscope VR-3200" manufactured by KEYENCE CORPORATION. Specifically, for the range of 54 mm×72 mm of the surface, distorted stripe projection images were captured using a 4-mega-pixel monochrome C-MOS camera at a magnification of 12× under structured illumination light emitted from a high-intensity LED. After correcting the distortion at a waviness removal of 5%, the surface roughness was measured. Then, in accordance with ISO 25178, the skewness (Ssk), the kurtosis (Sku), and the maximum height (Sz) of surface roughness were calculated.
(Scratch Resistance)

Figure 3:
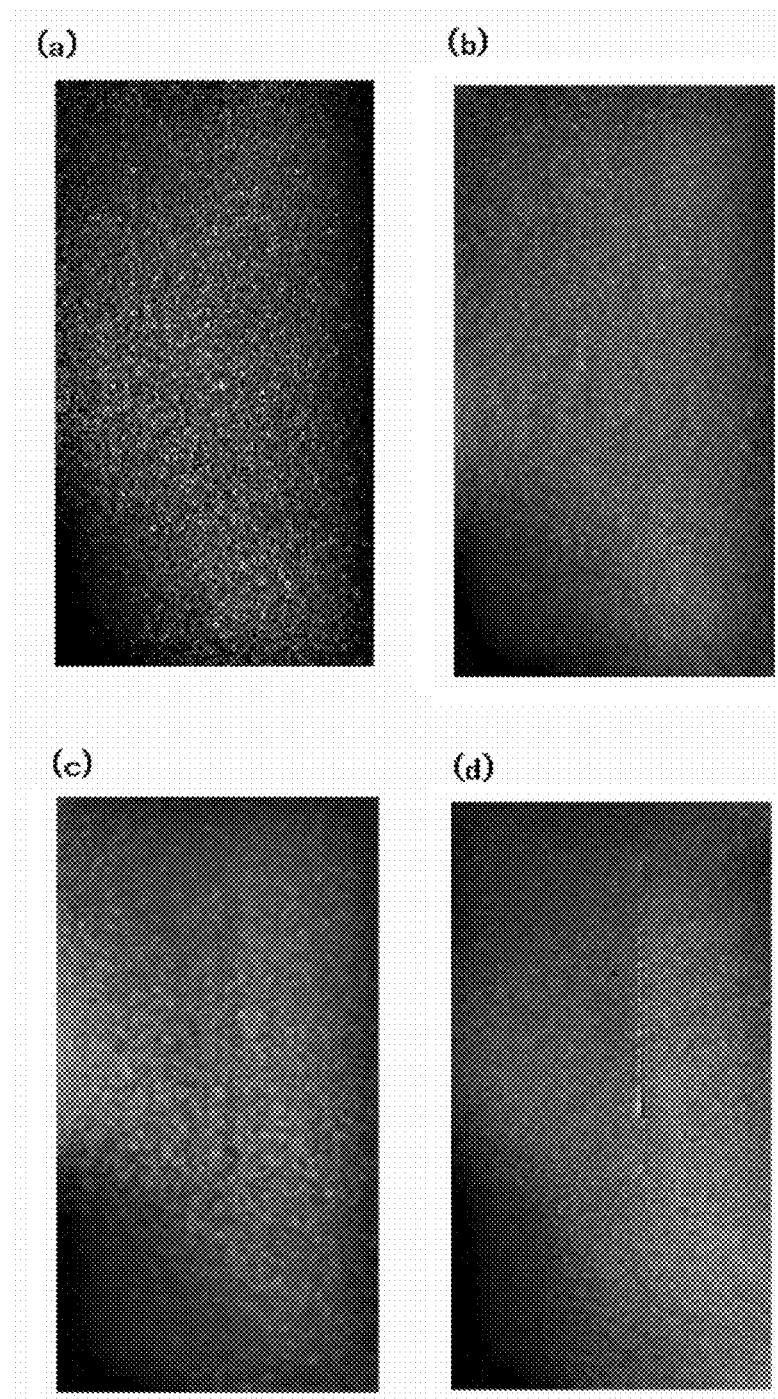
FIG. 3 shows photographs of surfaces of grain-finished leather-like sheets for illustrating evaluation results of the examples.

The scratch resistance was measured using a Linear Abraser 5750 (manufactured by Taber Industries), which was a linear abrasion tester. Specifically, a tungsten carbide tip having a semi-spherical end with a diameter of 1.0 mm was reciprocated once on the surface of the polyurethane skin film of the grain-finished leather-like sheet, with a load of 1 kgf, a stroke length of 1 inch, and a movement speed of 1 inch/sec. Then, the state of scratches left on the surface of the polyurethane skin film was observed with the naked eye after one hour and after one month, and evaluation was made according to the following criteria. Note that the images as evaluated as A to D, respectively, are shown in FIG. 3. In FIG. 3, (a) corresponds to A, (b) corresponds to B, (c) corresponds to C, and (d) corresponds to D.

A: Almost no scratch or indentation was identifiable.
B: Although no scratch was seen, indentations were left.
C: Scratches were slightly seen.
D: Scratches were clearly seen.

Example 1

Island-in-the-sea composite fibers composed of 45 parts by mass of 6-nylon (sea component) and 55 parts by mass of polystyrene (island component) were obtained by melt spinning. The fibers were stretched 3 times, and an fiber oil solution was applied thereto. Then the fibers were mechanically crimped, and thereafter dried. The resulting crimped fibers were cut into 51 mm, to give staples with 3 dtex. After forming a web of the stables, the web was needle-punched alternately from both sides thereof at a total density of about 500 punch/cm$^2$, thus obtaining a non-woven fabric. This non-woven fabric had a basis weight of 350 g/m$^2$ and an apparent specific gravity (apparent density) of 0.17 (g/cm$^3$). This non-woven fabric was treated with a 4% aqueous solution of polyvinyl alcohol, then compression-set to have a thickness of about 1.3 mm, and the surface was smoothed by buffing. Then, the non-woven fabric was impregnated with a dimethylformamide (hereinafter referred to as "DMF") solution of a polyurethane composed mainly of a polyester-based polyurethane at a concentration of 13%. Furthermore, the same polyurethane solution was applied to the surface of the non-woven fabric in an amount of 100 g/m$^2$ as a solid content, and thereafter the non-woven fabric was immersed in a DMF/water liquid mixture, to wet-coagulate the polyurethane into a porous structure. Then, the island component was removed by dissolution in hot toluene, to convert the composite fibers into hollow fibers, thereby obtaining a fiber base material on which a polyurethane porous layer serving as a polyurethane intermediate layer was stacked. According to an observation using a microscope, the polyurethane porous layer had a thickness of 300 μm.

Then, a dimethylformamide solution of a silicone-modified polycarbonate-based polyurethane containing a black pigment (NES 9015-22: Si-modified polycarbonate-based PU, manufactured by Dainichiseika Color & Chemicals Mfg. Co., Ltd.) was applied to the surface of the polyurethane porous layer using a 150-mesh gravure roll such that the thickness after drying was about 8 μm, to form a colored skin film. Then, the skin film was embossed at a temperature of 170° C., a pressure of 15 kg/cm, and a processing speed of 1.5 m/min, using an embossing roll having, on the entire surface thereof, a pattern of microscopic irregularities (referred to as a "pattern A") including recesses having an average depth of 60 μm at a density of 18 recesses/mm$^2$, thus forming a polyurethane skin film having an uneven surface. In this manner, a grain-finished artificial leather, which was a grain-finished leather-like sheet, was produced. Then, the produced grain-finished artificial leather was evaluated according to the above-described evaluation methods. The results are shown in Table 1.

TABLE 1

| Ex. No. | Polyurethane skin film | Type of microscopic irregularities | Maximum height (Sz) μm | Maximum peak height (Sp) μm | Maximum valley depth (Sv) μm | Skewness (Ssk) — | Kurtosis (Sku) — | Root mean square height (Sq) μm | Arithmetic mean height (Sa) μm | Results of scratch evaluation 1 hr later | Results of scratch evaluation 1 mth later |
|---|---|---|---|---|---|---|---|---|---|---|---|
| Ex. 1 | Si-modified polycarbonate-based PU | Pattern A | 143.34 | 59.80 | 83.51 | −0.40 | 3.69 | 9.81 | 7.77 | A | A |
| Ex. 2 | Si-modified polycarbonate-based PU | Pattern A | 66.16 | 35.85 | 30.31 | −0.26 | 3.47 | 4.11 | 3.27 | A | A |
| Ex. 3 | Si-modified polycarbonate-based PU | Pattern A | 60.50 | 27.23 | 33.27 | −0.22 | 3.08 | 3.52 | 2.76 | A | A |
| Com. Ex. 1 | Si-modified polycarbonate-based PU | Pattern B | 39.11 | 17.45 | 21.66 | −0.30 | 2.87 | 4.93 | 3.97 | C | C |
| Com. Ex. 2 | Si-modified polycarbonate-based PU | Pattern C | 39.11 | 16.88 | 14.68 | 0.10 | 3.08 | 3.22 | 2.56 | B | B |
| Com. Ex. 3 | Polycarbonate-based PU | Pattern A | 131.71 | 64.41 | 67.30 | −0.38 | 11.44 | 6.02 | 4.24 | D | D |
| Com. Ex. 4 | Si-modified polycarbonate-based PU | DE 125 | 22.53 | 10.87 | 11.66 | 0.05 | 3.00 | 2.56 | 2.04 | D | D |
| Com. Ex. 5 | Polyester-based PU | R-70N | 31.59 | 13.07 | 18.52 | −0.36 | 3.37 | 3.77 | 2.98 | D | D |
| Com. Ex. 6 | Polyester-based PU | Pattern C | 96.12 | 49.46 | 46.66 | −0.41 | 7.69 | 3.81 | 2.90 | D | D |
| Com. Ex. 7 | Polyester-based PU | Pattern A | 208.79 | 101.35 | 107.44 | 0.08 | 5.61 | 15.49 | 11.07 | D | D |

Example 2

A grain-finished artificial leather was produced in the same manner as in Example 1 except that the skin film was embossed using the embossing roll at a temperature of 170° C., a pressure of 10 kg/cm, and a processing speed of 2 m/min, instead of embossing the skin film using the embossing roll at a temperature of 170° C., a pressure of 15 kg/cm, and a processing speed of 1.5 m/min in Example 1, and the obtained grain-finished artificial leather was evaluated. The results are shown in Table 1.

Example 3

A grain-finished artificial leather was produced in the same manner as in Example 1 except that NY-324 manufactured by DIC Corporation was used in place of NES 9015-22 manufactured by Dainichiseika Color & Chemicals Mfg. Co., Ltd., as the silicone-modified polycarbonate-based polyurethane in Example 1, and the obtained grain-finished artificial leather was evaluated. The results are shown in Table 1.

Comparative Example 1

A grain-finished artificial leather was produced in the same manner as in Example 1 except that the skin film was embossed using an embossing roll having, on the entire surface thereof, a pattern of microscopic irregularities (referred to as a "pattern B") including recesses having an average depth of 30 μm at an density of 18 recesses/mm$^2$, instead of embossing the skin film using an embossing roll having, on the entire surface thereof, a pattern of microscopic irregularities (pattern A) including recesses having an average depth of 60 μm at a density of 18 recesses/mm$^2$ in Example 1, and the obtained grain-finished artificial leather was evaluated. The results are shown in Table 1.

Comparative Example 2

A grain-finished artificial leather was produced in the same manner as in Example 1 except that the skin film was embossed using an embossing roll having, on the entire surface thereof, a pattern of microscopic irregularities (referred to as a "pattern C") including recesses having an average depth of 20 μm at a density of 23 recesses/mm$^2$, instead of embossing the skin film using an embossing roll having, on the entire surface thereof, a pattern of microscopic irregularities (pattern A) including recesses having an average depth of 60 μm at a density of 18 recesses/mm$^2$ in Example 1, and the obtained grain-finished artificial leather was evaluated. The results are shown in Table 1.

Comparative Example 3

A grain-finished artificial leather was produced in the same manner as in Example 1 except that a silicone unmodified polycarbonate-based polyurethane (ME 8210: polycarbonate-based PU, manufactured by Dainichiseika Color & Chemicals Mfg. Co., Ltd.) was used in place of the silicone-modified polycarbonate-based polyurethane, as the polyurethane for forming a polyurethane skin film including an uneven surface in Example 1, and the produced grain-finished artificial leather was evaluated. The results are shown in Table 1.

Comparative Example 4

Onto release paper having a grain pattern formed thereon (DE-125 manufactured by Dai Nippon Printing Co., Ltd.), a solution containing 100 parts by mass of a silicone-modified polycarbonate-based polyurethane solution (NES 9015-22, with a resin content of 25%, manufactured by Dainichiseika Color & Chemicals Mfg. Co., Ltd.), 20 parts by mass of a pigment varnish (RESAMINE DUT 4790 black (manufactured by Dainichiseika Color & Chemicals Mfg. Co., Ltd.)), 30 parts by mass of DMF, and 30 parts by mass of methyl ethyl ketone was applied such that the thickness after drying was 15 μm, and dried, to form a top layer constituting a polyurethane skin film.

Then, onto the top layer, a DMF solution containing 100 parts by mass of a one-pack type polyether-based polyurethane (RESAMINE ME 8116 manufactured by Dainichiseika Color & Chemicals Mfg. Co., Ltd.) and 20 parts by mass of a pigment varnish (RESAMINE DUT 4790 black) was applied such that the thickness after drying was 20 μm, and dried, to form a polyurethane skin intermediate layer constituting a polyurethane skin film. The obtained polyurethane skin film had a total thickness of the top layer and the skin intermediate layer, of 35 μm.

Then, 130 g/m$^2$ of a polyurethane-based adhesive solution was applied to the surface of the intermediate layer of the polyurethane skin film, and dried at 120° C. for 15 seconds, to evaporate the solvent, thus forming an adhesion layer. Then, the adhesion layer was attached to the same fiber base material as obtained in Example 1 on which the polyurethane porous layer was stacked, thus forming a stack intermediate. Note that a polyurethane-based adhesive solution containing, as an adhesive component, 100 parts by mass of TA 205FT (manufactured by Dainichiseika Color & Chemicals Mfg. Co., Ltd.) serving as a crosslinkable polyurethane-based adhesive to which a crosslinking agent and a crosslinking accelerator were added, and containing 5 parts by mass of DMF and 10 parts by mass of ethyl acetate as solvents was used as the polyurethane-based adhesive solution.

Then, the adhesion layer was allowed to permeate the polyurethane porous layer, while the obtained stack intermediate was pressure-bonded by being pressed using pressing rolls with a clearance of 1.0 mm, corresponding to about 65% of a total thickness 1.5 mm of the polyurethane porous layer and the fiber base material, provided therebetween. Then, the whole was dried at 130° C. for 3 minutes, and thereafter aged at 50° C. for 3 days. Then, after the aging, the release paper was released, to obtain a grain-finished artificial leather. Then, the obtained grain-finished artificial leather was evaluated in accordance with the above-described evaluation methods. The results are shown in Table 1.

Comparative Example 5

A grain-finished artificial leather was produced in the same manner as in Comparative Example 4 except that the step of producing the top layer in Comparative Example 4 was changed as follows, and the obtained grain-finished artificial leather was evaluated. The results are shown in Table 1.

Onto release paper having a grain pattern formed thereon (R-70N manufactured by Dai Nippon Printing Co., Ltd.), a solution containing 100 parts by mass of a polyether-based polyurethane solution (ME 8116, with a resin content of 30%, manufactured by Dainichiseika Color & Chemicals Mfg. Co., Ltd.), 20 parts by mass of a pigment varnish (RESAMINE DUT 4790 black (manufactured by Dainichiseika Color & Chemicals Mfg. Co., Ltd.)), 30 parts by mass of DMF, and 30 parts by mass of methyl ethyl ketone was applied such that the thickness after drying was 15 μm, and dried, to form a top layer constituting a polyurethane skin film.

Comparative Example 6

A grain-finished artificial leather was produced in the same manner as in Example 1 except that a polyester-based polyurethane containing, as a soft segment, a polyethylene polypropylene adipate that was not modified with silicone and in which N % was 4.0% was used in place of the silicone-modified polycarbonate-based polyurethane, as the polyurethane for forming a polyurethane skin film having an uneven surface in Comparative Example 2, and the obtained grain-finished artificial leather was evaluated. The results are shown in Table 1.

Comparative Example 7

A grain-finished artificial leather was produced in the same manner as in Comparative Example 6 except that the skin film was embossed using an embossing roll having, on the entire surface thereof, a pattern of microscopic irregularities (pattern A) including recesses having an average depth of 60 μm at a density of 18 recesses/mm$^2$, instead of embossing the skin film using an embossing roll having, on the entire surface thereof, a pattern of microscopic irregularities (pattern C) including recesses having an average depth of 20 μm at a density of 23 recesses/mm$^2$ in Comparative Example 6, and the obtained grain-finished artificial leather was evaluated. The results are shown in Table 1.

As shown in Table 1, for the grain-finished leather-like sheets of Examples 1 to 3, in each of which the polyurethane skin film contained a silicone-modified polyurethane, and had an uneven surface whose maximum height (Sz), skewness (Ssk), and kurtosis (Sku) respectively satisfied 60 μm≤Sz≤150 μm, −0.4≤Ssk≤−0.2, and 3≤Sku≤4, almost no scratch or indentation was identifiable after one hour and after one month in the scratch evaluation. On the other hand, for the grain-finished leather-like sheets of Comparative Examples 1, 2, and 4, in each of which the polyurethane skin film contained a silicone-modified polyurethane, but had an uneven surface whose maximum height (Sz), skewness (Ssk), and kurtosis (Sku) did not respectively satisfy 60 μm≤Sz≤150 μm, −0.4≤Ssk≤−0.2, and 3≤Sku≤4, some indentations were left, or scratches were seen, after one hour and after one month. For the grain-finished leather-like sheets of Comparative Examples 3, 5, and 6, in each of which the polyurethane skin film did not contain a silicone-modified polyurethane, scratches were clearly seen after one hour and after one month in the scratch evaluation. Also, for the grain-finished leather-like sheet of Comparative Example 7, in which the polyurethane skin film did not contain a silicone-modified polyurethane, and had an uneven surface whose maximum height (Sz) and kurtosis (Sku) did not respectively satisfy 60 μm≤Sz≤150 μm, and 3≤Sku≤4, scratches were clearly seen after one hour and after one month in the scratch evaluation.

The invention claimed is:
1. A grain-finished leather-like sheet comprising:
a fiber base material;
a polyurethane intermediate layer stacked on the fiber base material; and
a polyurethane skin film stacked directly on the polyurethane intermediate layer or via another polyurethane layer, wherein:
the polyurethane skin film comprises a silicone-modified polyurethane, and
the grain-finished leather-like sheet has an uneven surface whose maximum height (Sz), skewness (Ssk), and kurtosis (Sku) of surface roughness in accordance with ISO 25178 respectively satisfy 60 µm≤Sz≤150 µm, −0.4≤Ssk≤−0.2, and 3≤Sku≤4.

2. The grain-finished leather-like sheet according to claim 1, wherein the grain-finished leather-like sheet has the uneven surface whose maximum peak height (Sp) satisfies 20 µm≤Sp≤70 µm.

3. The grain-finished leather-like sheet according to claim 1, wherein the grain-finished leather-like sheet has the uneven surface whose maximum valley depth (Sv) satisfies 20 µm≤Sv≤100 µm.

4. The grain-finished leather-like sheet according to claim 1, wherein the grain-finished leather-like sheet has the uneven surface whose arithmetic mean height (Sa) satisfies 2 µm≤Sa≤10 µm.

5. The grain-finished leather-like sheet according to claim 1, wherein the grain-finished leather-like sheet has the uneven surface whose root mean square height (Sq) satisfies 1 µm≤Sq≤10 µm.

6. The grain-finished leather-like sheet according to claim 1, wherein the polyurethane intermediate layer is a polyurethane porous layer.

7. The grain-finished leather-like sheet according to claim 1, wherein the polyurethane skin film is stacked directly on the polyurethane intermediate layer.

8. The grain-finished leather-like sheet according to claim 1, wherein the polyurethane skin film is stacked on the polyurethane intermediate layer via another polyurethane layer.

9. The grain-finished leather-like sheet according to claim 1, wherein the grain-finished leather-like sheet has the uneven surface whose maximum peak height (Sp) satisfies 20 µm≤Sp≤60 µm.

10. The grain-finished leather-like sheet according to claim 1, wherein the grain-finished leather-like sheet has the uneven surface whose maximum valley depth (Sv) satisfies 20 µm≤Sv≤60 µm.

11. The grain-finished leather-like sheet according to claim 1, wherein the fiber base material has a thickness from 300 to 3000 µm.

12. The grain-finished leather-like sheet according to claim 1, wherein the polyurethane intermediate layer has a thickness from 100 to 600 µm.

13. The grain-finished leather-like sheet according to claim 1, wherein the polyurethane intermediate layer has a thickness from 200 to 400 µm.

14. The grain-finished leather-like sheet according to claim 1, wherein the silicone-modified polyurethane comprises a silicone-modified polycarbonate-based polyurethane.

15. The grain-finished leather-like sheet according to claim 1, wherein the polyurethane skin film further comprises a pigment.

16. The grain-finished leather-like sheet according to claim 1, wherein the polyurethane skin film has a thickness from 2 to 30 µm.

17. The grain-finished leather-like sheet according to claim 1, wherein the polyurethane skin film has a thickness from 5 to 20 µm.

* * * * *